May 19, 1970     CHARLES CHI LIANG ETAL     3,513,027

SOLID ELECTROLYTE AND SOLID ELECTROLYTE BATTERY SYSTEM

Filed March 27, 1969

CELL VOLTAGE UNDER A LOAD OF 100K OHMS AS A FUNCTION OF TIME

INVENTOR.
CHARLES C. LIANG
JAMES EPSTEIN
BY
ATTORNEY

United States Patent Office 3,513,027
Patented May 19, 1970

3,513,027
SOLID ELECTROLYTE AND SOLID ELECTROLYTE BATTERY SYSTEM
Charles Chi Liang, Andover, and James Epstein, Sharon, Mass., assignors to P. R. Mallory & Co., Inc., Indianapolis, Ind., a corporation of Delaware
Filed Mar. 27, 1969, Ser. No. 811,119
Int. Cl. H01m
U.S. Cl. 136—83                4 Claims

ABSTRACT OF THE DISCLOSURE

A solid electrolyte battery is provided with a separator having the composition $4LH-NH_4I$, having a high conductivity. It is particularly useful with a cathode of composition $MAg_4I_5$, where M may be either $NH_4$ or K or Rb; and with an anode of active metal, such as lithium.

This invention relates to a solid electrolyte battery system with a higher current capability than conventional solid electrolyte battery systems.

Miniaturization in electronics has been rapidly advancing in recent years and has resulted in increased demand for special power sources characterized by volume and weight comparable to those of electronic components employed in the circuitry. Some degree of success in meeting this demand has been achieved by employing solid electrolyte cells. Apart from the advantage of miniaturization, solid electrolyte cells and batteries permit great flexibility in design and possess extremely long shelf-life of the order of five to ten years.

The electrolytes employed in solid state cells are ionic conductors and, when incorporated between suitable anodes and cathodes, deliver voltage and current. The performance of any given cell depends on the specific resistance of the electrolyte, the nature of the conducting species and their transport number, the temperature of the cell, and the initial and final products of the cell reactions.

It is an object of the present invention to improve solid electrolyte cells.

It is another object of the present invention to provide a solid electrolyte cell characterized by high energy density.

It is another object of the present invention to provide a solid electrolyte cell embodying a cathode and a separator characterized by high conductivities.

It is a further object of the present invention to provide novel and improved high energy solid electrolyte cells and batteries having an extremely long shelf life, a large and continuous output of electrical energy for its size, and which may be readily manufactured and sold on a practical and commercial scale at a low cost.

Other and further objects and advantages of the present invention will become apparent from the following description, taken in conjunction with the accompanying drawings in which FIG. 1 is a perspective view, with a partial vertical sectional view of a solid electrolyte cell embodying the principles of the present invention;

FIG. 2 is a vertical sectional view of a battery structure embodying a cell of the construction shown in FIG. 1 and FIG. 3 is a graph showing the polarization characteristics of the cell shown in FIG. 1.

Broadly stated, in accordance with the principles of the present invention, there is provided a solid electrolyte cell in which the cathode and the separator materials of this invention are complexes and/or solid solutions with high conductivities.

(1) *Cathode.*—The depolarizer of this invention is a complex of the composition $MAg_4I_5$ ($M=NH_4$, K or Rb). The conductivity of this complex is about $10^{-2}$ ohm$^{-1}$ cm.$^{-1}$ at room temperature. In addition to $MAg_4I_5$, any heavy metal or transition metal iodide such as $PbI_2$, $HgI_2$, CuI, AgI, can also be used as a depolarizer material. The cathode should comprise a mixture of the depolarizer and the $4LiI \cdot NH_4I$ electrolyte. The use of the electrolyte material in the cathode is adapted to decrease the polarization of the electrode and facilitate the ionic conduction.

(2) *Separator.*—The separator of this invention is a complex or solid solution of the composition $4LiI \cdot NH_4I$ which can be made by slowly drying an aqueous solution containing 80 mole percent of LiI and 20 mole percent of $NH_4I$. The conductivity of this complex or solid solution is about $2 \times 10^{-6}$ ohm$^{-1}$cm.$^{-1}$ at room temperature which is higher than that of either LiI ($10^{-7}$ohm$^{-1}$cm.$^{-1}$) or $NH_4I$ ($10^{-8}$ ohm$^{-1}$ cm.$^{-1}$).

The complex MAg ($M=NH_4$, K or Rb) is known to have a high ionic conductivity and has been used as a separator of solid electrolyte cells. However, due to the presence of $Ag^+$ ions, the complex can be used with a Ag anode only. More active metals such as Zn, Mg, Li, etc. would be oxidized by the $Ag^+$ complex. Therefore, the conventional use of the complex $MAg_4I_5$ as a separator is very limited. In this invention, the complex $MAg_4I_5$ is used as the cathode material together with the active anodes such as Li, and a cell voltage higher than 2.1 volts can be obtained.

The complex or solid solution $4LiI \cdot NH_4I$ is suitable as a separator for high voltage solid electrolyte cells. It does not react with active metals such as Li yet its conductivity is higher than that of either LiI or $NH_4I$.

Operation

A test cell, $Li/NH_4I \cdot LiI/NH_4Ag_4I_5$ was made and its physical dimensions were:

Surface area=1.2 cm.$^2$
Thickness of the Li anode=0.04 cm.$^2$
Thickness of the $NH_4I \cdot 4LH$ separator=0.065 cm.
Thickness of the $NH_4Ag_4I_5$ cathode=0.065 cm.

The open circuit voltage of the test cell was 2.1 volts, as expected by thermodynamic calculation. The cell voltage under a 100 kilohm load was about 1.5 volts at room temperature. No significant change in load voltage was observed after the cell has been discharged continuously for five days. In addition to the anode, other active metals such as Mg, La, Ba and Zn can also be used as an anode material.

The current capability of the solid electrolyte system of this invention represents a considerable improvement over the system using LiI as the separator. If a 0.065 cm. thick LiI separator were used in the cell, the cell voltage under the same 100 kilohm would be 0.29 volt.

The novelty of this invention is that the separator material $NH_4I \cdot 4LiI$, unlike the Ag complex, can be used in solid electrolyte systems with anodes more active than Ag. The conductivity of the new complex is higher than any known separator in its class.

The details of construction of a cell and the assembly of a battery unit, together with a graph of the voltage under certain test conditions, are shown in the accompanying drawings, in which.

Figure 1:
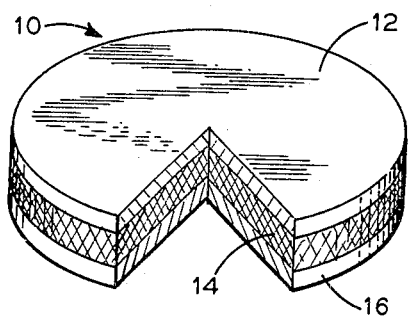
FIG. 1 is a perspective sectional view of a cell of this invention.

As shown in FIG. 1, a typical cell structure 10, according to the invention, is provided with an anode 12, a separator 14, and a cathode 16 having the chemical composition specified above for the test cell.

Figure 2:
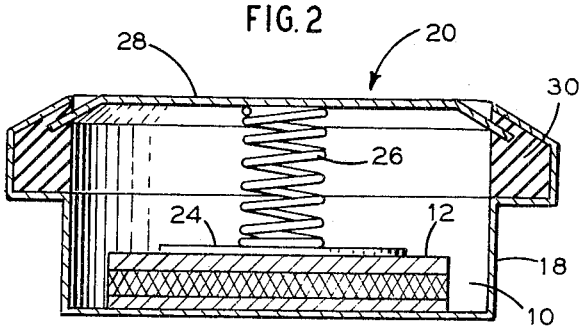
FIG. 2 is a schematic sectional view of a battery unit.

FIG. 2 shows a cell 10 assembled in a can or metal container 18 to serve and be operable as a battery unit 20. The cell 10 is shown seated with its cathode 16 physically and electrically in contact with the metal floor 22 of the can 18, over the full area of the cathode for low resistance contact. A contact plate 24 engages and seats on the top exposed surface of the anode 12 to serve as a terminal for the anode. A compression spring 26 is disposed between contact plate 24 and a disc plate 28 that serves as a cover to close can 18, and that also serves as an accessible outer terminal for anode 12. The disc plate 28 also serves as a physical reaction element to hold the spring compressed to maintain any desired pressure on the contact plate 24. Both ends of contact spring may be soldered or welded to the two plates 24 and 28 for good electrical contact.

The outer anode terminal plate 28 is supported at its peripheral rim edge border on suitable insulating and sealing material 30 that seals the can closed and separates the anode terminal plate 28 from the metal of the can 18. The space within the can may be suitably filled with an inert setting plastic material, to hold the cell 10 and the related elements in place, and may be part of the insulating material of seal 30.

Figure 3:
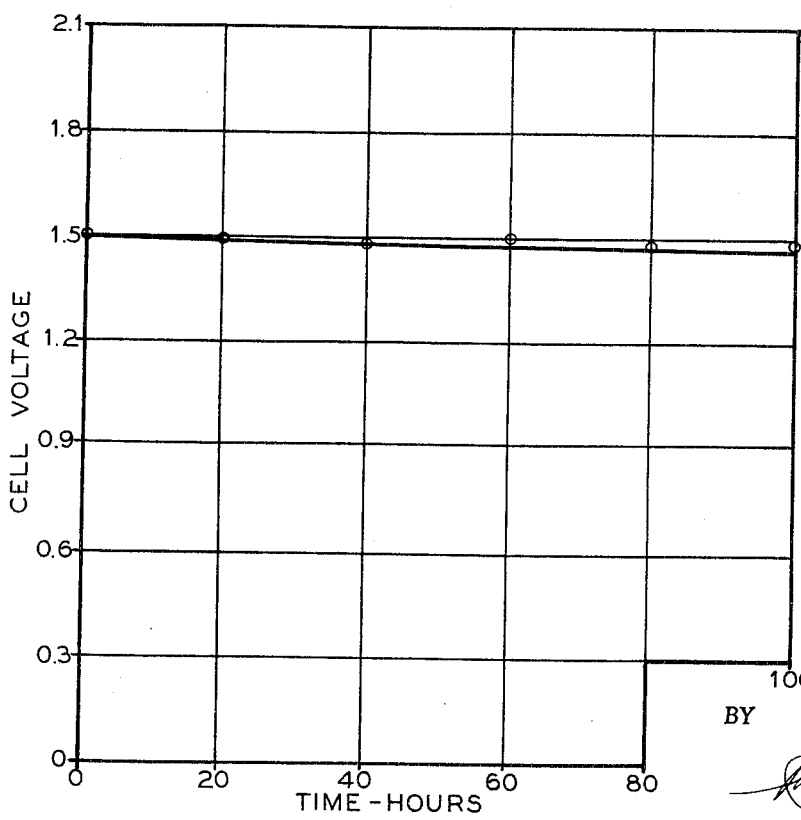
FIG. 3 is a graph showing the stability of the cell voltage after discharge through a large resistor for a long time interval.

FIG. 3 shows a graph of the load voltage of the cell after discharge for five days through a load of 100 kilohms, and illustrates the effectiveness of the depolarizing action that prevents dropping of the voltage curve.

Although the present invention has been disclosed in connection with preferred embodiments thereof, variations and modifications may be resorted to by those skilled in the art without departing from the present invention. All of these variations and modification are considered to be within the true spirit and scope of the invention, as disclosed in the foregoing description and defined by the appended claims.

What is claimed is:
1. A solid electrolyte cell, comprising:
   an anode;
   a cathode constituting a complex having the composition $MAg_4I_5$, where M is one of $NH_4$, or K, or Rb; and
   a complex or solid solution electrolyte separator having the composition $4LiI \cdot NH_4I$.

2. A solid electrolyte cell, as in claim 1, in which said anode consists of the element lithium.

3. A solid electrolyte cell, as in claim 2, in which said separator is a complex or solid solution having the composition $4LiI \cdot NH_4I$.

4. A solid electrolyte cell, comprising:
   an anode;
   a cathode; and
   an electrolyte separator having the composition $$4LiI \cdot NH_4I.$$

References Cited

UNITED STATES PATENTS

| | | | |
|---|---|---|---|
| 2,937,219 | 5/1960 | Minnick et al. | 136—6 |
| 3,186,875 | 6/1965 | Freeman | 136—153 |
| 3,189,485 | 6/1965 | Panzer | 136—93 |

OTHER REFERENCES

Evaluation of New Cathode-Anode Couples for Secondary Batteries, by E. F. Uhler and G. S. Lozier. Technical Documentary Report No. ASD–TDR–62–4.

WINSTON A. DOUGLAS, Primary Examiner

A. SKAPARS, Assistant Examiner

U.S. Cl. X.R.

136—137, 153